United States Patent Office 3,231,530

Patented Jan. 25, 1966

3,231,530
DYEABLE POLYPROPYLENE-STEARIC ACID COMPOSITIONS

Helmut F. Prahl, Stoughton, Wis., assignor to Monsanto Company, St. Louis, Mo., a corporation of Delaware No Drawing. Filed July 6, 1962, Ser. No. 208,110
2 Claims. (Cl. 260—23)

This invention relates to improved polyolefin compositions. More particularly, this invention relates to new compositions of matter composed of a polyolefin and a fatty acid which possess increased receptivity for dyestuffs.

Recently the advent of stereoregular high crystalline polyolefins has resulted in substantial interest being expressed in polyolefins as filament and fiber-forming materials. Polyolefins are limited in their use as textile filaments and fibers primarily because of their poor dyeability, ultraviolet light stability and low melting point. Many proposals have been put forth in the past to improve these defects of otherwise excellent textile fibers. Such proposals have, however, nearly always resulted in some deterioration of other fiber properties or in limited or negligible dye receptivity.

It is an object of this invention to provide improved filament and fiber-forming polyolefin compositions.

Another object of this invention is to provide polyolefin filaments and fibers having improved affinity for dyestuffs without serious deterioration of the physical properties of the fiber.

Other objects and advantages of this invention will become apparent from the following detailed description and the appended claims.

In general, the objects of this invention are accomplished by blending a polyolefin with from about 1 to about 20 percent of a fatty acid, then extruding the blend to form polyolefin filaments and fibers which are more receptive to dye stuffs.

The blending may be accomplished by grinding the polyolefin and the fatty acid to be mixed therewith to a fine powder. The compounds are then thoroughly blended mechanically, transferred to an appropriate container, melted and stirred for about 15 minutes to one hour to insure homogeneity of the melt. The molten polymer is then extruded through a suitable spinneret at a temperature of from about 210° C. to about 320° C.

The proportions of polyolefin and fatty acid may be varied according to the type of end product desired. The invention is applicable to crystalline polyolefins containing from about 1 to about 20 percent fatty acid by weight. Preferably, the compositions of this invention contain about 10 percent fatty acid.

Illustrative of polyolefins suitable for the purposes of this invention include polymers from alpha-olefins, such as polyethylene, polypropylene, polybutene-1, poly-4-methylpentene-1, and the like.

The fatty acids suitable for the purposes of this invention are compounds having the formula

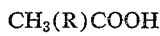

$$CH_3(R)COOH$$

wherein R is hyddocarbon radical containing at least 10 carbon atoms.

Illustrative of suitable saturated fatty acids that may be used in carrying out this invention are lauric acid, myristic acid, palmitic acid, stearic acid, arachidic acid, behenic acid, lignoceric acid, cerotic acid, and the like.

Illustrative of suitable unsaturated fatty acids that may be used for the purposes of this invention are Δ9,10-dodecylenic acid, palmitoleic acid, oleic acid, ricinoleic acid, petroselinic acid, vaccenic acid, linoleic acid, linolenic acid, eleostearic acid, licanic acid, parinaric acid, tariric acid, gadoleic acid, arachidonic acid, cetoleic acid, erucic acid, nervonic acid, and the like.

The modified polyolefin compositions of this invention exhibit desirable textile properties. These fibers have shown excellent results with conventional disperse dyeing methods as well as with basic dyeing methods. Such blends not only exhibit better dyeability, but also show greatly improved spinnability.

The following examples are used to illustrate the invention and are not intended to limit it in any way. Unless otherwise noted percentages as expressed in the examples indicate percent by weight. The components of the dye bath are all based upon the weight of the fiber sample.

*Example I*

Ten grams of stearic acid were added to 90 grams of powdered polypropylene and this mixture was blended in a V-blendor. This blended mixture was then melt spun by conventional melt spinning techniques. A sample of the above undrawn fibers was subjected to a conventional basic dyeing process. The dye bath was a 40:1 ratio of liquor to fiber, the liquor containing 5.0 percent Sevron Blue 2G (C.I. Basic Blue 22) and 12.0 percent urea. The dye bath with fiber sample was heated to 100° C. and maintained at that temperature for 2 hours. The fibers were then withdrawn, rinsed in cool water, given a neutral scour and dried. The fibers were a moderate blue and dye penetration of the fibers was uniformly good.

*Example II*

The exact procedure of Example I was repeated in preparing the undrawn fibers. The fibers were placed in a dye bath of 40:1 ratio of liquor to fiber, the liquor containing 5.0 percent Sevron Blue 2G (C.I. Basic Blue 22), 12 percent urea, 20 grams/liter of chlorobenzene, 1 gram/liter of Duponol ME (sodium lauryl sulfate) and 0.5 gram/liter of cetyl alcohol. The dye bath with fiber sample was heated to 100° C. and maintained at that temperature for 2 hours. The fibers were then withdrawn, rinsed in cool water, given a neutral scour and dried. The fibers were a moderate blue and dye penetration of the fibers was uniformly good.

*Example III*

The exact procedure of Example I was used in preparing the undrawn fibers. The fibers were placed in a dye bath of 40:1 ratio of liquor to fiber, the liquor containing 2.0 percent Cibacete Brilliant Blue BG New (C.I. Disperse Blue 3), 1 gram/liter of sodium dibasic phosphate, 1 gram/liter of sodium monobasic phosphate, and 1.0 percent Igepon T–33 (sodium N-methyl-N-oleoyl taurate). The dye bath with fiber sample was heated to 100° C. and maintained at that temperature for 2 hours. The fibers were then withdrawn, rinsed in cool water, given a neutral scour and dried. The fibers were a strong purplish blue and dye penetration of the fibers was uniformly good.

*Example IV*

Ten grams of stearic acid were added to 90 grams of powdered polypropylene and this mixture was blended in a V-blendor. This blended mixture was then melt spun by conventional melt spinning techniques and the resulting filaments and fibers were drawn at a ratio of 6 times their original length by usual fiber drawing methods.

A sample of the above drawn fibers was subjected to a conventional basic dyeing process. The dye bath was a 40:1 ratio of liquor to fiber, the liquor containing 5.0 percent Sevron Blue 2G (C.I. Basic Blue 22) and 12.0 percent urea. The dye bath with fiber sample was heated to 100° C. and maintained at that temperature for 2 hours. The fibers were then withdrawn, rinsed in cool water, given a neutral scour and dried. The fibers were a light purplish blue and dye penetration of the fibers was uniformly good.

*Example V*

The exact procedure of Example IV was repeated in preparing the drawn fibers. The fibers were placed in a dye bath of 40:1 ratio of liquor to fiber, the liquor containing 5.0 percent Sevron Blue 2G (C.I. Basic Blue 22), 12 percent urea, 20 grams/liter of chlorobenzene, 1 gram/liter of Duponol ME (sodium lauryl sulfate) and 0.5 gram/liter of cetyl alcohol. The dye bath with fiber sample was heated to 100° C. and maintained at that temperature for 2 hours. The fibers were then withdrawn, rinsed in cool water, given a neutral scour and dried. The fibers were a light purplish blue and dye penetration of the fibers was uniformly good.

*Example VI*

The exact procedure of Example IV was repeated in preparing the drawn fibers. The fibers were placed in a dye bath of 40:1 ratio of liquor to fiber, the liquor containing 2.0 percent Cibacete Brilliant Blue BG New (C.I. Disperse Blue 3), 1 gram/liter of sodium dibasic phosphate, 1 gram/liter of sodium monobasic phosphate, and 1.0 percent Igepon T-33 (sodium N-methyl-N-oleoyl taurate). The dye bath with fiber sample was heated to 100° C. and maintained at that temperature for 2 hours. The fibers were then withdrawn, rinsed in cool water, given a neutral scour and dried. The fibers were a strong blue color and dye penetration of the fibers was uniformly good.

As many widely different embodiments of this invention may be made without departing from the spirit and scope thereof it is to be understood that the invention is not limited to specific embodiments thereof except as defined in the appended claims.

I claim:

1. A dyeable composition of matter comprising from about 85 to 95 percent by weight, based upon the total weight of the composition, of polypropylene and from about 5 to 15 percent by weight, based upon the total weight of the composition, of stearic acid.

2. A dyeable composition of matter comprising about 90 percent by weight, based upon the total weight of the composition, of polypropylene and about 10 percent by weight, based upon the total weight of the composition, of stearic acid.

References Cited by the Examiner

UNITED STATES PATENTS 3,017,238 1/1962 Levine et al. --------- 260—23

FOREIGN PATENTS 629,845 10/1961 Canada.

LEON J. BERCOVITZ, *Primary Examiner.*

DONALD E. CZAJA, *Examiner.*